(12) United States Patent
Kurita

(10) Patent No.: US 11,979,435 B2
(45) Date of Patent: May 7, 2024

(54) RELAY SERVER, RELAY METHOD AND RELAY PROGRAM

(71) Applicant: Nippon Telegraph and Telephone Corporation, Tokyo (JP)

(72) Inventor: Hiroyuki Kurita, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 333 days.

(21) Appl. No.: 17/613,275

(22) PCT Filed: Jun. 18, 2019

(86) PCT No.: PCT/JP2019/024052
§ 371 (c)(1),
(2) Date: Nov. 22, 2021

(87) PCT Pub. No.: WO2020/255241
PCT Pub. Date: Dec. 24, 2020

(65) Prior Publication Data
US 2022/0232050 A1    Jul. 21, 2022

(51) Int. Cl.
*H04L 65/1046* (2022.01)
*H04L 65/1069* (2022.01)
*H04M 3/42* (2006.01)
*H04M 7/00* (2006.01)

(52) U.S. Cl.
CPC ...... *H04L 65/1046* (2013.01); *H04L 65/1069* (2013.01); *H04M 3/4228* (2013.01); *H04M 7/0081* (2013.01)

(58) Field of Classification Search
CPC ... H04W 84/047; H04W 88/04; H04W 88/06; H04L 65/1043
See application file for complete search history.

(56) References Cited

U.S. PATENT DOCUMENTS

| | | | |
|---|---|---|---|
| 2015/0032232 A1* | 1/2015 | Soldi | G05B 19/048 700/287 |
| 2018/0351907 A1* | 12/2018 | Ryu | H04L 61/5046 |
| 2020/0281037 A1* | 9/2020 | Cui | H04W 76/15 |

FOREIGN PATENT DOCUMENTS

JP    4757321    6/2011

* cited by examiner

Primary Examiner — Kevin Kim
(74) Attorney, Agent, or Firm — Fish & Richardson P.C.

(57) ABSTRACT

A relay server 31 includes: a detection unit 31A that detects a failure of a subscriber server 21; and a relay unit 31B that relays call connection requests 51, 52, and 53 to another network in which corresponding subscribers may possibly be accommodated according to connection attempt network information indicating networks to attempt a call connection, when a failure of the subscriber server 21 is detected by the detection unit 31A.

9 Claims, 7 Drawing Sheets

| TELEPHONE NUMBER | EQUIPMENT POSITION | SUBSCRIBER ATTRIBUTE INFORMATION |
|---|---|---|
| XXXX-xxxx | HOME | ATTRIBUTE INFORMATION RELATED TO ADDITIONAL SERVICE AND THE LIKE |
| YYYY-yyyy | HOME | ATTRIBUTE INFORMATION RELATED TO ADDITIONAL SERVICE AND THE LIKE |
| ZZZZ-zzzz | PSTN | — |
| WWWW-wwww | PROVIDER A | — |

Fig. 3

| NUMBER BAND | RELAY DESTINATION | CONNECTION ATTEMPT NETWORK |
|---|---|---|
| XXXX (NGN NUMBER BAND) | SUBSCRIBER SERVER 21 | NONE |
| YYYY (PSTN NUMBER BAND) | SUBSCRIBER SERVER 21 | PSTN |
| ZZZZ (PSTN NUMBER BAND) | SUBSCRIBER SERVER 21 | PSTN |
| WWWW (PROVIDER A NUMBER BAND) | SUBSCRIBER SERVER 21 | PROVIDER A |

31D

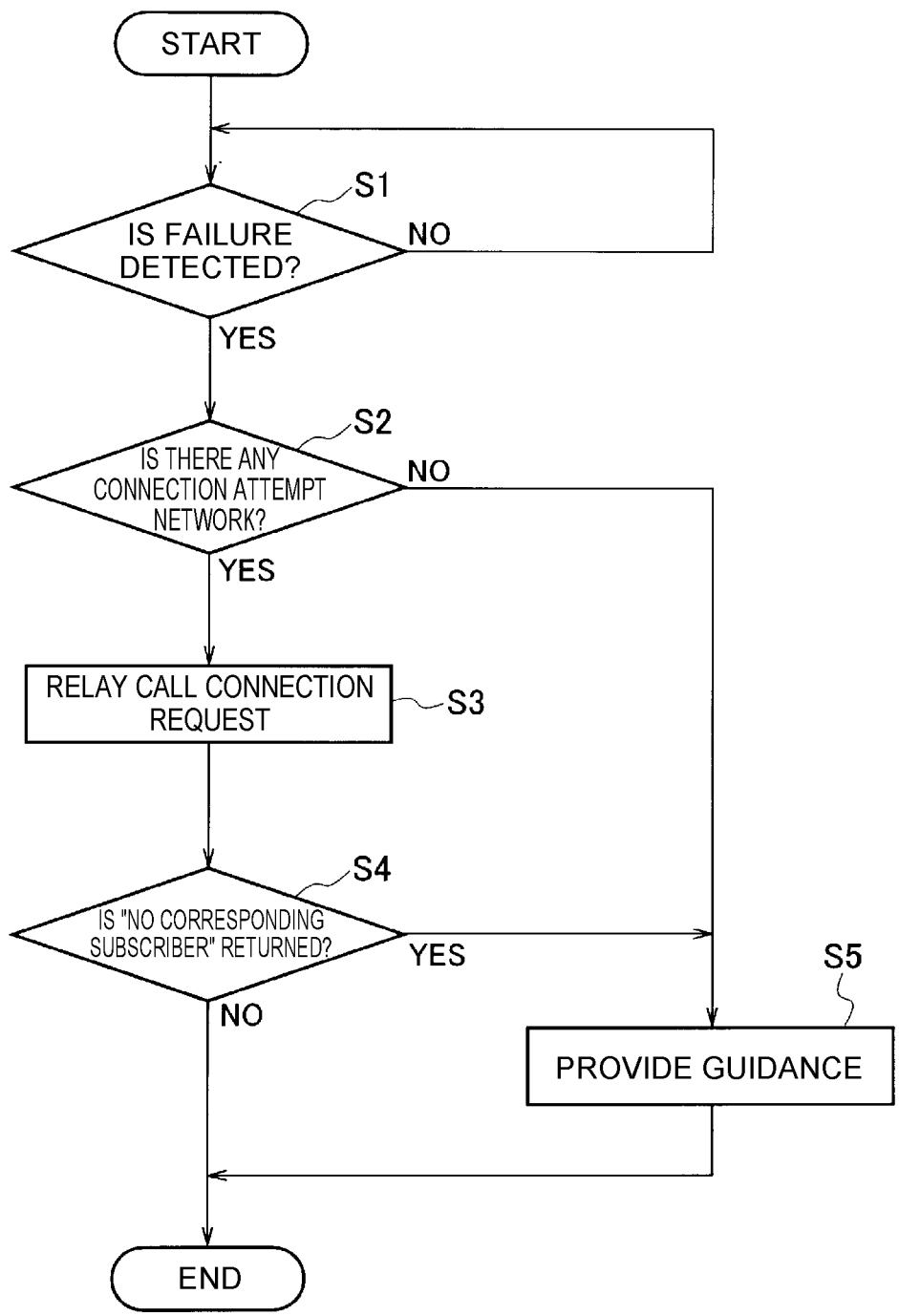

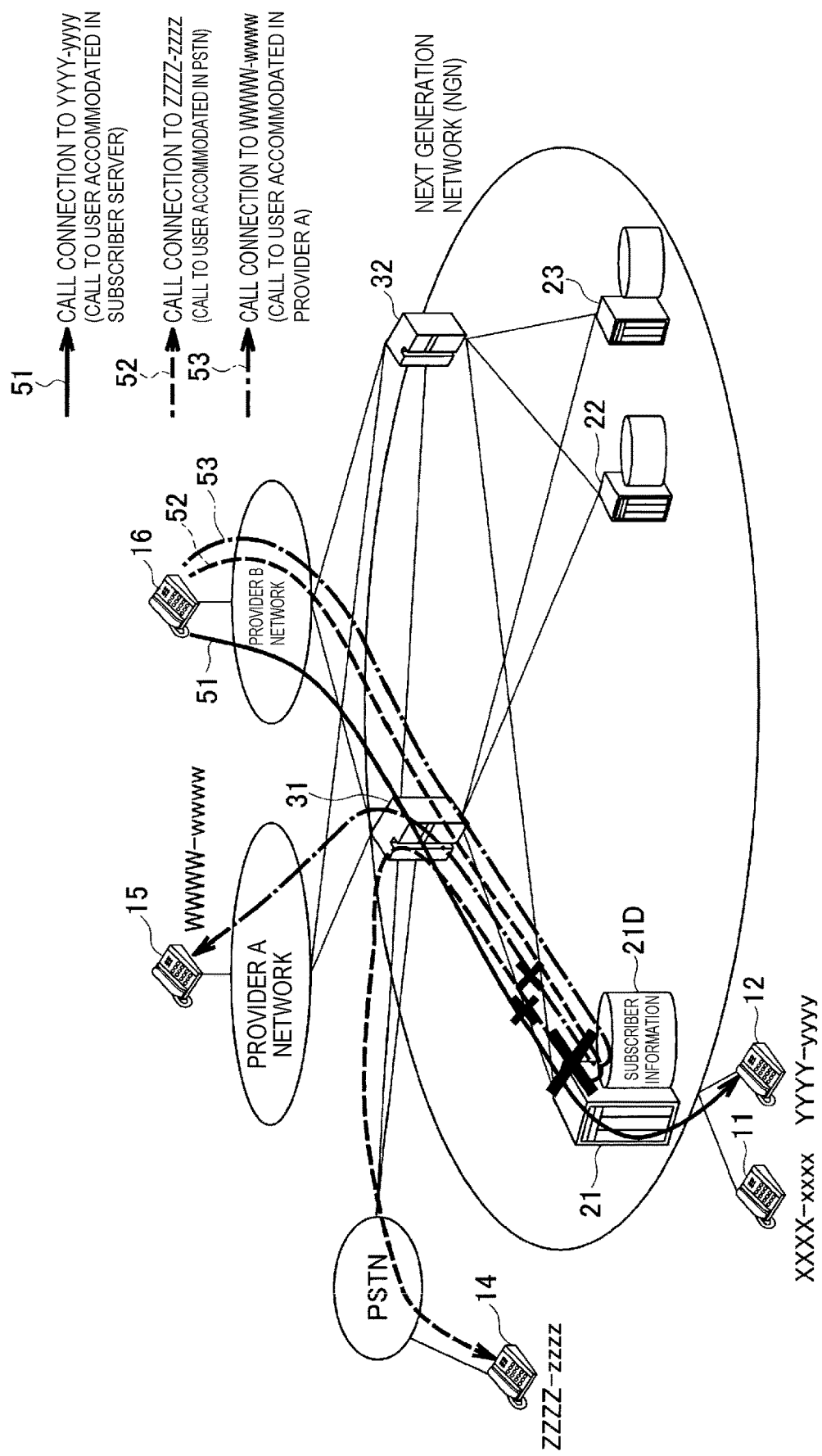

RELAY SERVER, RELAY METHOD AND RELAY PROGRAM

CROSS-REFERENCE TO RELATED APPLICATIONS

This application is a National Stage application under 35 U.S.C. § 371 of International Application No. PCT/JP2019/024052, having an International Filing Date of Jun. 18, 2019. The disclosure of the prior application is considered part of the disclosure of this application, and is incorporated in its entirety into this application.

TECHNICAL FIELD

The present invention relates to a relay server, a relay method, and a relay program.

BACKGROUND ART

Conventionally, there has been known a communication system that relays and transfers session information (see Patent Literature 1). In the communication system disclosed in Patent Literature 1, a next generation network (NGN) configured with a plurality of arbitrarily divided groups can be connected to PSTN (Public Switchboard Telephone Network) and an IP network of another company, and subscriber terminals of the next generation network can be connected to terminals of those networks. Further, when a failure occurs in a part of a connection path thereof, a detour path can be used for connection.

CITATION LIST

Patent Literature

Patent Literature 1: Japanese Patent No. 4757321

SUMMARY OF THE INVENTION

Technical Problem

By the way, in a telephone service, there is provided number portability with which change of the provider or change to a next generation network (NGN) from PSTN can be done without changing the telephone number of the subscriber. For the number portability, subscriber information (equipment position information and the like) is inquired to a destination subscriber server at the time of the call connection. Therefore, unfortunately, when the subscriber server stops due to a disaster of extreme severity or the like, not only the subscribers accommodated in the subscriber server but also the subscribers to which the number portability is provided become unable to receive incoming calls.

The present invention is designed in view of the aforementioned circumstances, and the object of the present invention is to provide a relay server, a relay method, and a relay program capable of relieving incoming calls to subscribers accommodated in other provider networks or the like even when a subscriber server stops due to a failure or the like.

Means for Solving the Problem

A relay server according to an aspect of the present invention includes: a detection unit that detects a failure of a subscriber server; and a relay unit that relays a call connection request to another network in which a corresponding subscriber may possibly be accommodated according to connection attempt network information indicating a network to attempt a call connection, when a failure of the subscriber server is detected by the detection unit.

A relay method according to an aspect of the present invention executes, by a relay server: a detection step that detects a failure of a subscriber server; and a relay step that relays a call connection request to another network in which a corresponding subscriber may possibly be accommodated according to connection attempt network information indicating a network to attempt a call connection, when a failure of the subscriber server is detected in the detection step.

An aspect of the present invention is a relay program that causes a computer to function as the relay server.

Effects of the Invention

According to the present invention, it is possible to provide the relay server, the relay method, and the relay program capable of relieving incoming calls to the subscribers accommodated in other provider networks or the like even when the subscriber server stops due to a failure or the like.

BRIEF DESCRIPTION OF DRAWINGS

FIG. 2 is a diagram illustrating subscriber information held in a subscriber server according to the embodiment of the present invention.

FIG. 3 is a diagram illustrating relay destination information held in a relay server according to the embodiment of the present invention.

FIG. 7 is a flowchart illustrating an example of operations of the relay server according to the embodiment of the present invention.

FIG. 8 is a block diagram illustrating an entire communication system of a comparative example.

DESCRIPTION OF EMBODIMENTS

Figure 1:
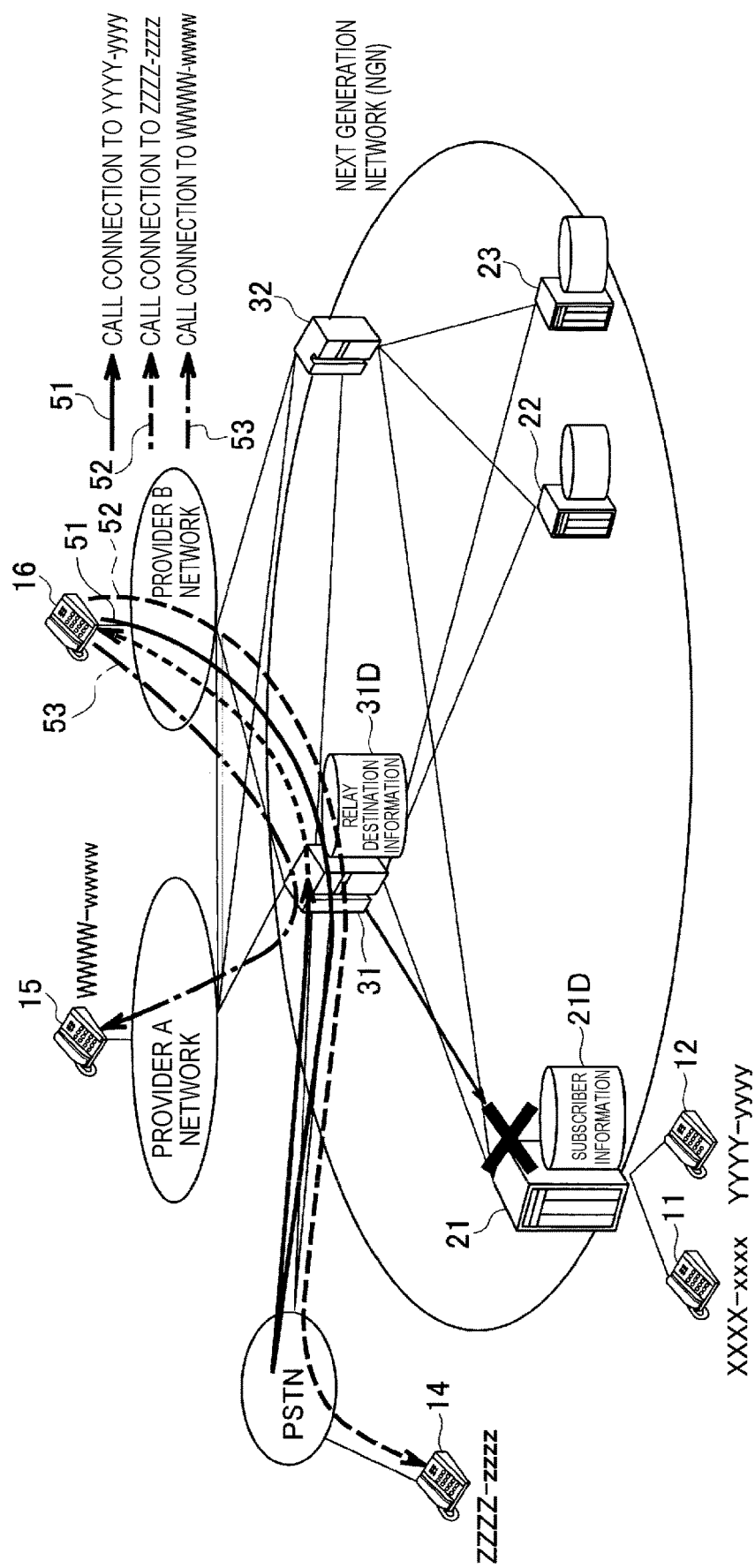
FIG. 1 is a block diagram illustrating an entire communication system according to an embodiment of the present invention.

Hereinafter, embodiments of the present invention will be described with reference to the accompanying drawings. Same reference signs are applied to same components in the description of the drawings to avoid duplicated explanations thereof.

A communication service provider employs a next generation network (NGN) that establishes and controls communication by using SIP (Session Initiation Protocol). With the next generation network, mutual communication with PSTN is possible by employing a device that converts signals between PSTN (Public Switched Telephone Network) and the next generation network. Further, with the next generation network, mutual connection with IP networks of other providers is also possible by connecting to the SIP servers of those other providers.

While mainly PSTN has undertaken the mutual connection function between the providers heretofore, it is becoming necessary for the next generation network to undertake the mutual connection with other providers, which has been undertaken by PSTN, because maintenance of the switchboard configuring PSTN start to reach the limit. Furthermore, in the relation between PSTN and the next generation network, the next generation network also needs to undertake the leading role in relaying a call connection request.

By the way, in a telephone service, there are provided portability between providers when changing the provider without changing the telephone numbers of the subscribers, service portability when changing the service from PSTN to the next generation network, location portability when changing the equipment position, and the like from the viewpoint of convenience of the subscribers. It is assumed here that, in the next generation network, telephone number bands to be accommodated in the subscriber servers are set for each of SIP servers (subscriber servers hereinafter) to which the subscribers are accommodated. Even if such telephone number bands are set, when a specific subscriber holding the number in the number band uses various kinds of portability, the subscriber is accommodated in a different subscriber server from the subscriber server, PSTN, or another provider network. Therefore, the subscriber server needs to hold not only attribute information of the subscriber accommodated in the subscriber server but also actual equipment position (PSTN, another provider network, or the like) of the subscriber who uses the various kinds of portability.

At this time, when the function of the subscriber server stops, not only the subscribers accommodated in the subscriber server but also the subscribers actually accommodated in PSTN or another provider network become unable to receive incoming calls. That is, while it is common for the subscriber server to increase availability such as use of highly reliable hardware and redundancy of power supply routes, there is a possibility that the function stops due to double failures of the power supply routes, damages to buildings in a disaster of extreme severity, or the like. In that case, it is necessary to prevent the termination of the function of the subscriber server from affecting also on incoming calls to the subscribers of PSTN and another provider network.

Thus, the embodiment of the present invention enables reception of incoming calls for the subscribers whose equipment positions are held on the subscriber server but not actually accommodated, even in a case where the function of the subscriber server stops. Specifically, upon detecting a failure of the subscriber server, a relay server relaying a call connection request (SIP signal) relays a call connection request to another network in which actually the subscriber may possibly be accommodated according to connection attempt network information of each telephone number band held in advance. Further, when a response "no corresponding subscriber" is returned from the network at the time of relaying the call connection request to another network, a guidance is provided to a caller terminal notifying that there is a failure being occurred.

Embodiments

Hereinafter, a communication system according to an embodiment of the present invention will be described in detail with reference to the accompanying drawings.

(Overall Configuration of Communication System)

FIG. 1 is a block diagram illustrating an entire communication system according to the embodiment of the present invention. As illustrated in FIG. 1, the communication system according to the embodiment of the present invention includes subscriber terminals 14, 15, 16, . . . , subscriber servers 21, 22, . . . , relay servers 31, 32, . . . , and the like. The subscriber terminals 14, 15, and 16 are general-purpose terminals such as telephones. The subscriber servers 21 and 22 are general-purpose SIP servers that hold equipment positions and attribute information of the subscribers. The relay servers 31 and 32 are SIP servers including a connection function with PSTN.

A next generation network is capable of having mutual communication with PSTN and also capable of having mutual communication with a provider A network and a provider B network by connecting to SIP servers of the provider A and the provider B. The subscriber servers 21, 22, and 23 hold not only the attribute information of the subscribers accommodated in the subscriber servers 21, 22, and 23 but also actual equipment positions (PSTN, the provider A network, or the like) of the subscribers using various kinds of portability.

In this example, assumed is a case where the subscriber terminal 16 accommodated in the provider B network makes a call to YYYY-yyyy, ZZZZ-zzzz, and WWWW-wwww. That is, an arrow 51 in the diagram indicates a call connection to YYYY-yyyy (a call to a user accommodated in the subscriber server 21), an arrow 52 indicates a call connection to ZZZZ-zzzz (a call to a user accommodated in PSTN), and an arrow 53 indicates a call connection to WWWW-wwww (a call to a user accommodated in the provider A). For the call connection request, the same reference numerals 51, 52, and 53 are used.

FIG. 2 is a diagram illustrating subscriber information 21D held in the subscriber server 21. As illustrated in FIG. 2, telephone numbers, equipment position information, and subscriber attribute information are included in the subscriber information 21D. The subscribers of XXXX-xxxx and YYYY-yyyy are the users accommodated in the server itself (the users accommodated in the subscriber server 21). The subscriber of ZZZZ-zzzz is the user accommodated in PSTN. The subscriber of WWWW-wwww is the user accommodated in the provider A.

FIG. 3 is a diagram illustrating relay destination information 31D held by the relay server 31 according to the embodiment of the present invention. As illustrated in FIG. 3, number bands, relay destination information, and connection attempt network information are included in the relay destination information 31D. The relay destination information is the information indicating the original relay destination. The connection attempt network information is the information indicating a network that may be able to receive an incoming call by attempting a call connection (in other words, a network in which the user to receive an incoming call may possibly be accommodated). In a case where the telephone number band included in the call connection request is NGN number band (XXXX), it is indicated that the relay destination is the subscriber server 21 and that there is no connection attempt network. That is, it is indicated to have no connection attempt network since the user of the NGN number band is necessarily accommodated in the subscriber server 21 (no possibility of being accommodated in PSTN or another provider network). Further, in a case where the telephone number band included in the call connection request is the PSTN number band (YYYY, ZZZZ), it is indicated that the relay destination is the subscriber server 21 and that the connection attempt network is PSTN. Furthermore, in a case where the telephone number band included in the call connection request is the number band of the provider A (WWWW), it is indicated that the relay destination is the subscriber server 21 and that the connection attempt network is the provider A.

As described, for each of the number bands included in the call connection requests 51, 52, and 53, the relay server 31 holds in advance the information indicating which of the subscriber servers 21, 22, and 23 the call connection requests 51, 52, and 53 are to be transferred. Therefore, in a state where the subscriber servers 21, 22, and 23 are operating properly, the call connection requests 51, 52, and 53 are transferred as follows.

For example, in a case where the relay server 31 receives the call connection request 51, the call connection request 51 is transferred to the subscriber server 21 from the relay server 31 and, if the subscriber of YYYY-yyyy is accommodated under the subscriber server 21, the call connection request 51 is directly transferred to the subscriber terminal 12 of YYYY-yyyy. In the meantime, in a case where the relay server 31 receives the call connection request 52, the call connection request 52 is transferred to the subscriber server 21 from the relay server 31, it is returned to the relay server 31 from the subscriber server 21 that the subscriber of ZZZZ-zzzz is accommodated on the PSTN side, and the call connection request 52 is transferred to the PSTN side from the relay server 31. Similarly, in a case where the relay server 31 receives the call connection request 53, the call connection request 53 is transferred to the subscriber server 21 from the relay server 31, it is returned to the relay server 31 from the subscriber server 21 that the subscriber of WWWW-wwww is accommodated on the provider A side, and the call connection request 53 is transferred to the provider A side from the relay server 31.

Note here that, as illustrated in FIG. 1, it is assumed that the subscriber server 21 holding the subscriber information 21D stops the function due to damages to buildings or the like. In that case, conventionally, not only the subscribers actually accommodated in the subscriber server 21 but also the subscribers actually accommodated in other networks (PSTN, another provider) become unable to receive incoming calls. Further, in that case, it is not possible to distinguish whether the connection destination is really "no corresponding subscriber" or accommodated in the subscriber server 21 that is having a failure. Thus, if "no corresponding subscriber" is directly notified to the caller side, there is a possibility of sending a wrong notification.

Therefore, when the subscriber server 21 holding the subscriber information 21D stops the function due to damages to buildings or the like, the relay server 31 according to the embodiment of the present invention relays the call connection request to another network in which the subscriber may possibly be accommodated according to the connection attempt network information held in advance (see FIG. 3) upon detecting a failure of the subscriber server 21 by a no-response timeout of the call connection request or the like. In this example, as illustrated in FIG. 1, the call connection requests 51 and 52 are relayed to PSTN, and the call connection request 53 is relayed to the provider A network. Since ZZZZ-zzzz is the subscriber accommodated in PSTN and WWWW-wwww is the subscriber accommodated in the provider A, the call connection will be successfully performed by relaying the call connection requests 52 and 53. This makes it possible to prevent the influence on incoming calls to the subscribers of PSTN and another provider network even when the function of the subscriber server 21 stops, so that reliability of the next generation network can be improved.

Further, at the time of relaying the call connection requests 51, 52, or 53 to another network, if a response "no corresponding subscriber" is returned from the network, the relay server 31 provides a guidance to the caller terminal (subscriber terminal 16) for notifying that there is a failure being occurred. In this example, the call connection request 51 is relayed to PSTN. However, YYYY-yyyy is not the subscriber accommodated in PSTN so that a response "no corresponding subscriber" is to be returned from PSTN. Thus, in that case, a guidance is provided to the caller terminal (subscriber terminal 16) for notifying that there is a failure being occurred. This makes it possible to avoid inconvenience of sending a notification "no corresponding subscriber" directly to the caller.

Figure 4:
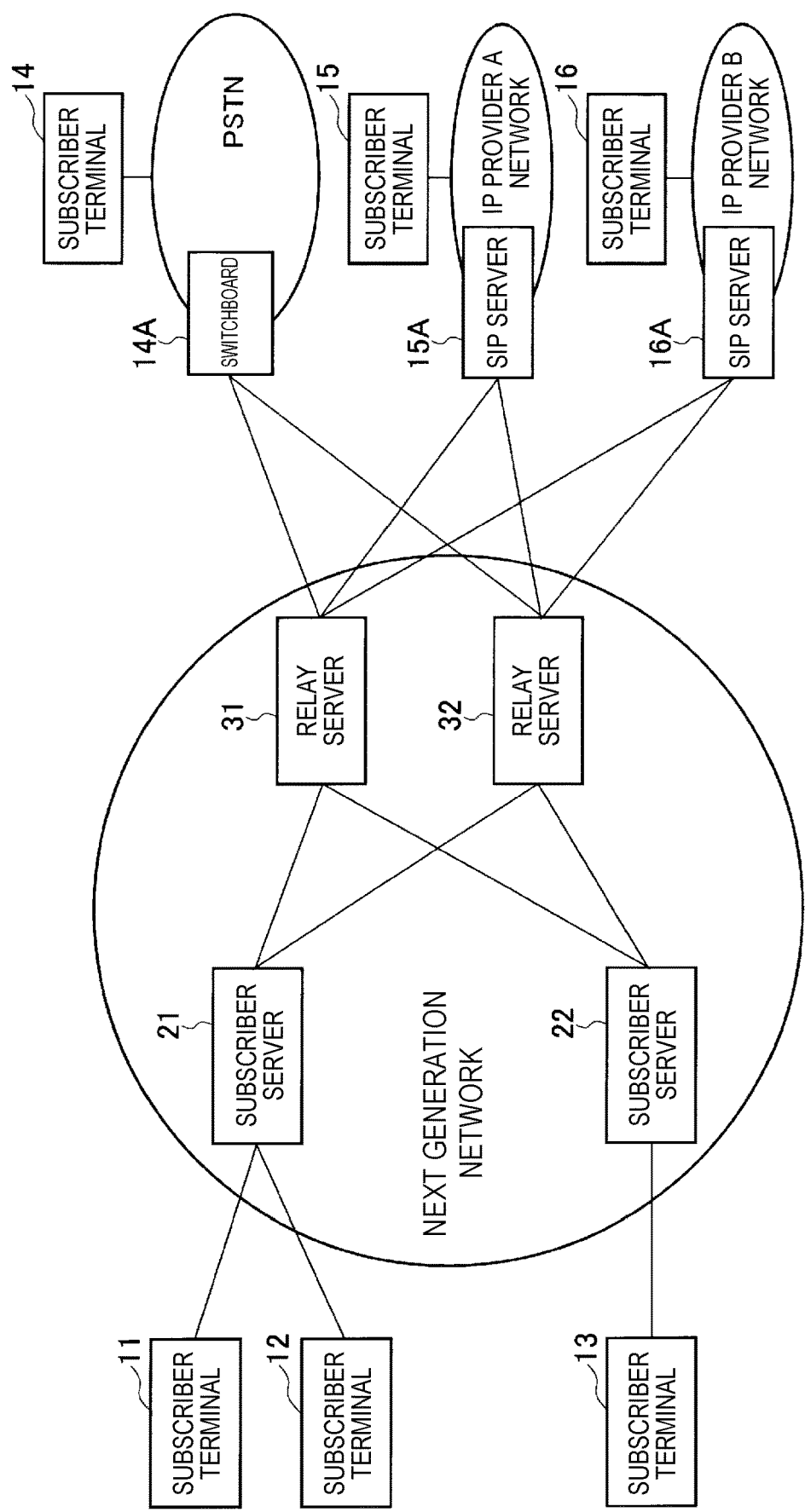
FIG. 4 is a block diagram illustrating the entire communication system according to the embodiment of the present invention.

FIG. 4 is a block diagram illustrating the entire communication system according to the embodiment of the present invention. As has been described above, the communication system according to the embodiment of the present invention includes the subscriber terminals 14, 15, 16, . . . , the subscriber servers 21, 22, . . . , the relay servers 31, 32, . . . , and the like. While not specifically mentioned in the explanation above, it is natural that there are a switchboard 14A and the like in PSTN, and there are also SIP servers 15A, 16A, and the like in the provider A network and the provider B network.

As described above, the embodiment of the present invention is a technique related to relay and transfer of a call connection when there is a failure in the subscriber server 21. That is, in a telephone service, there is provided number portability with which change of the provider or change to a next generation network (NGN) from PSTN can be done without changing the telephone number of the subscriber. For the number portability, subscriber information (equipment position information and the like) is inquired to the destination subscriber server 21 at the time of the call connection. Therefore, unfortunately, when the subscriber server 21 stops the function due to a disaster of extreme severity or the like, not only the subscribers accommodated in the subscriber server 21 but also the subscribers to which the number portability is provided become unable to receive incoming calls.

Therefore, in the embodiment of the present invention, when the subscriber server 21 stops the function, the relay server 31 relaying the call connection signal (SIP signal) to the subscriber server 21 relays and transfers the call connection requests 51, 52, and 53 to another provider network and the like in which the subscribers may possibly be accommodated according to the connection attempt network information for each of the telephone number bands held in advance. Thereby, (a part of) incoming calls to the subscribers accommodated in another provider network and the like is relieved even if the function of the subscriber server 21 stops due to a failure and the like, so that it is possible to decrease the influence of the failure upon the incoming calls.

(Configuration of Relay Server)

Figure 5:
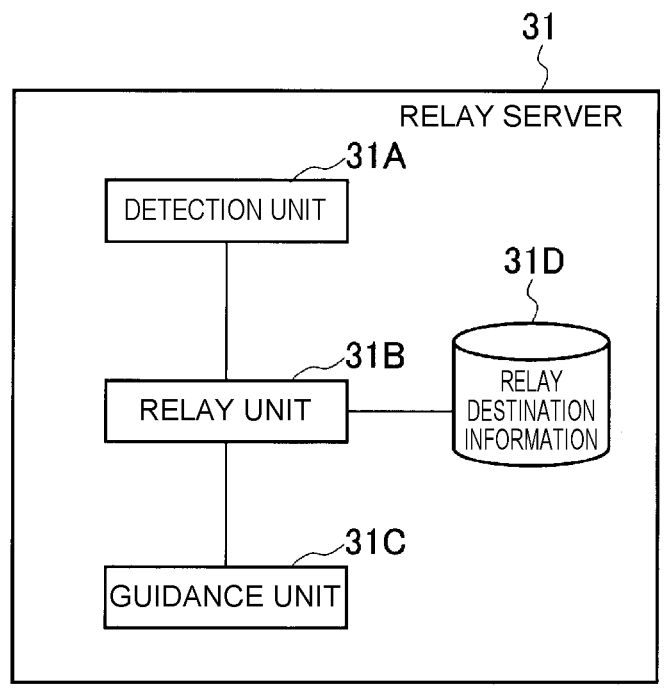
FIG. 5 is a functional block diagram of the relay server according to the embodiment of the present invention.

FIG. 5 is a functional block diagram of the relay server 31 according to the embodiment of the present invention. The relay server 31 is a computer that relays the call connection requests (SIP signals) 51, 52, and 53, and includes a detection unit 31A, a relay unit 31B, a guidance unit 31C, and relay destination information 31D. The detection unit 31A detects the failure of the subscriber server 21 by a no-response timeout and the like of the call connection requests 51, 52, and 53 transmitted to the subscriber server 21. Upon detecting the failure of the subscriber server 21, the relay unit 31B relays the call connection requests 51, 52, and 53 transmitted from other servers according to the connection attempt network information held in advance. The relay unit 31B also has a function and the like for making an inquiry to the destination subscriber server 21 about the subscriber information at the time of the call connection. When a response indicating that there is no corresponding subscriber is returned from other servers to which the call connection requests 51, 52, and 53 are transmitted according to the connection attempt network information, the guidance unit 31C provides a guidance to the caller terminal (subscriber terminal 16) indicating that there is a failure being occurred. The content of the relay destination information 31D is as has been described above (see FIG. 3), and such relay destination information 31D is stored in a storage device to be described later.

Figure 6:
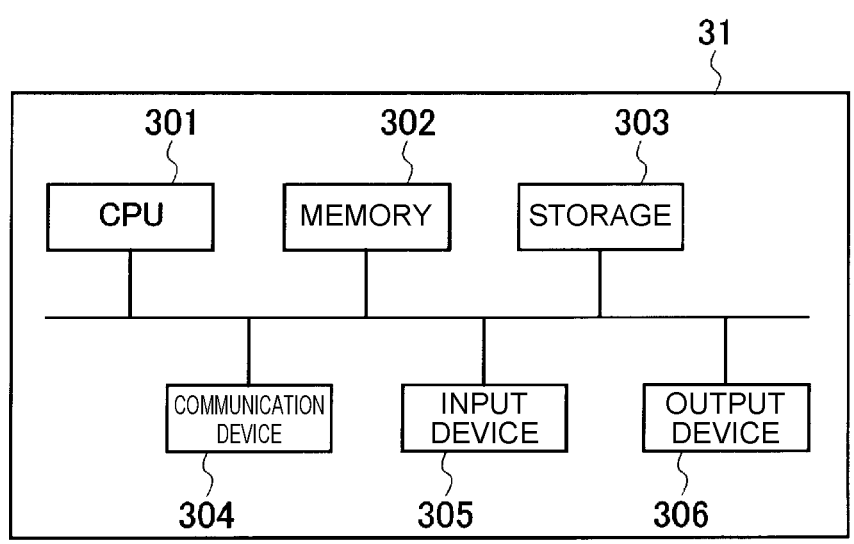
FIG. 6 is a block diagram of a hardware configuration of the relay server according to the embodiment of the present invention.

FIG. 6 is a block diagram of a hardware configuration of the relay server 31 according to the embodiment of the present invention. For the relay server 31 according to the embodiment described above, it is possible to use a general-purpose computer system that includes a CPU (Central Processing Unit, processor) 301, a memory 302, a storage 303 (HDD: Hard Disk Drive, SSD: Solid State Drive), a communication device 304, an input device 305, and an output device 306. The memory 302 and the storage 303 are storage devices. In this computer system, each function of the relay server 31 is implemented by executing, with the CPU 301, a prescribed program loaded on the memory 302.

Note that the relay server 31 may be implemented by a single computer or a plurality of computers. Further, the relay server 31 may be a virtual machine implemented on a computer.

A program for the relay server 31 can be stored in a computer-readable recording medium such as HDD, SSD, USB (Universal Serial Bus) memory, CD (Compact Disc), or DVD (Digital versatile Disc), or may be distributed via a network.

(Operations of Relay Server)

FIG. 7 is a flowchart illustrating an example of the operations of the relay server 31 according to the embodiment of the present invention. Herein, also assumed is a case where the subscriber server 21 stops the function.

First, upon detecting a failure of the subscriber server 21 by a no-response timeout or the like of the call connection requests 51, 52, and 53 (step S1), the relay server 31 refers to the connection attempt network information of the relay destination information 31D. Thereby, when there is no connection attempt network information, a guidance is provided to the caller terminal (subscriber terminal 16) for notifying that there is a failure being occurred (step S2→S5). In the meantime, when there is connection attempt network information, the call connection requests 51, 52, and 53 are relayed according to the connection attempt network information (step S2→S3).

Then, at the time of relaying the call connection requests 51, 52, and 53 to another network, if a response "no corresponding subscriber" is returned from the network, the relay server 31 provides a guidance to the caller terminal (subscriber terminal 16) for notifying that there is a failure being occurred (step S4→S5). In the meantime, when there are corresponding subscribers, the call connection will be successfully performed by relaying the call connection requests 51, 52, and 53.

Modification Example

Note that the present invention is not limited to the embodiments described above but various modifications are possible within the scope of the gist thereof. For example, the relay servers 31 and 32 may automatically start relay of the call connection requests 51, 52, and 53 using the connection attempt network information upon detecting a failure of the subscriber server 21 as the original relay destination or may start relay by an operation of a maintenance worker notified of having a failure. In a case where it is started by an operation of the maintenance worker, the maintenance worker may predict how long the failure of the subscriber server 21 will continue and start relay only when it is assumed that the failure state will last for a long time. Further, when relay of the call connection requests 51, 52, and 53 to the connection attempt networks is started with intervention of the maintenance worker, the relay destination information may be updated at the timing of starting relay of the call connection requests 51, 52, and 53 without holding in advance the connection attempt networks as the relay destination information separately from the original relay destination. Further, the relay destination information may not be held by the relay servers 31 and 32 but may be held by an independent different server, and each of the relay servers 31 and 32 may inquire to such a server about the relay destination information.

(Characteristic Configuration and Effects Thereof)

As described above, the relay server 31 according to the embodiment of the present invention includes the detection unit 31A and the relay unit 31B. The detection unit 31A detects the failure of the subscriber server 21. The relay unit 31B relays the call connection requests 51, 52, and 53 to another network in which the subscribers may possibly be accommodated according to the connection attempt network information indicating a network to attempt the call connection, when the failure of the subscriber server 21 is detected by the detection unit 31A. This makes it possible to provide the relay server 31 that is capable of relieving incoming calls to the subscribers accommodated in another provider network and the like, even if the subscriber server 21 stops due to a failure or the like.

The relay server 31 may further include the guidance unit 31C. When a response indicating that the subscribers are not accommodated is returned from other servers to which the call connection requests 51, 52, and 53 are relayed, the guidance unit 31C provides a guidance to the caller terminal (subscriber terminal 16) indicating that there is a failure being occurred. Thereby, it is possible to avoid inconvenience of sending a notification "no corresponding subscriber" directly to the caller side.

Further, the relay unit 31B may hold in advance the connection attempt network information for each of the telephone number bands and relay the call connection requests 51, 52, and 53 based on the telephone number bands included in the call connection requests 51, 52, and 53. Thereby, it is possible to increase the possibility of receiving incoming calls by attempting the call connection.

Further, when number portability is provided in the telephone service, the relay unit 31B may inquire to the destination subscriber 21 server about the subscriber information at the time of the call connection. That is, the present invention is effective when number portability is provided, and it is the invention with a high utilitarian value.

Further, in the relay method according to an embodiment of the present invention, the relay server 31 executes: a detection step that detects a failure of the subscriber server 21; and a relay step that relays the call connection requests 51, 52, and 53 to another network in which the subscribers may possibly be accommodated according to the connection attempt network information indicating a network to attempt the call connection, when a failure of the subscriber server 21 is detected in the detection step. Thereby, it is possible to provide the relay method capable of relieving incoming calls to the subscribers accommodated in other provider networks, even when the subscriber server 21 stops due to a failure or the like.

Further, the relay program according to an embodiment of the present invention is a relay program that causes a computer to function as the relay server 31. Thereby, it is possible to provide the relay program capable of relieving incoming calls to the subscribers accommodated in other provider networks, even when the subscriber server 21 stops due to a failure or the like.

Comparative Example

FIG. 8 is a block diagram illustrating an entire communication system of a comparative example. As illustrated in FIG. 8, it is assumed that the subscriber server 21 holding the subscriber information 21D stops the function due to damages to buildings or the like. In that case, according to the comparative example, not only the subscribers actually accommodated in the subscriber server 21 but also the subscribers actually accommodated in other networks (PSTN, another provider) become unable to receive incoming calls. Further, in that case, it is not possible to distinguish whether the connection destination is really "no corresponding subscriber" or accommodated in the subscriber server 21 that is having a failure. Thus, if "no corresponding subscriber" is directly notified to the caller side, there is a possibility of sending a wrong notification.

Note that distribution (relay) of calls to the subscriber servers 21, 22, and 23 is performed according to distribution destination information (routing information) for each of the number bands (XXXX-x, YYYY-y, and the like in a case of 1000 number bands) held in advance in the relay servers 31 and 32. If the relay servers 31 and 32 hold all the subscriber information, relay targeted at the actual equipment position (PSTN or other providers) is possible from the beginning. However, it is not practical from the viewpoint of the data amount.

Other Embodiments

While some embodiments are described above, it is to be understood that the description and the drawings forming a part of the disclosure are illustrative only and not intended as a limitation. Various substitute embodiments, examples, and operation techniques may occur to those skilled in the art from the disclosure. The embodiments of the present invention include various embodiments and the like that are not described herein.

REFERENCE SIGNS LIST

21 Subscriber server
22 Subscriber server
31 Relay server
31A Detection unit
31B Relay unit
31C Guidance unit
32 Relay server
51 Call connection request
52 Call connection request
53 Call connection request

The invention claimed is:

1. A relay server comprising:
a detection unit, including one or more processors, configured to detect a failure of a subscriber server;
a relay unit, including one or more processors, configured to relay a call connection request to another network in which a corresponding subscriber may be accommodated according to connection attempt network information indicating a network to attempt a call connection, when a failure of the subscriber server is detected by the detection unit; and
a guidance unit, including one or more processors, configured to provide to a caller terminal, a guidance indicating that there is a failure being occurred, when a response indicating that no corresponding subscriber is accommodated is returned from another server to which the call connection request is relayed.

2. The relay server according to claim 1, wherein the relay unit is configured to hold in advance the connection attempt network information for each of telephone number bands, and relays the call connection request based on the telephone number band included in the call connection request.

3. The relay server according to claim 1, wherein the relay unit is configured to inquire to the subscriber server as a destination about subscriber information at a time of the call connection, in a case where number portability is provided in a telephone service.

4. A relay method executing, performed by a relay server, the relay method comprising:
detecting a failure of a subscriber server;
relaying a call connection request to another network in which a corresponding subscriber may be accommodated according to connection attempt network information indicating a network to attempt a call connection, when a failure of the subscriber server is detected; and
providing to a caller terminal, a guidance indicating that there is a failure being occurred, when a response indicating that no corresponding subscriber is accommodated is returned from another server to which the call connection request is relayed.

5. A non-transitory computer readable medium storing one or more instructions causing a computer to execute:
detecting a failure of a subscriber server;
relaying a call connection request to another network in which a corresponding subscriber may be accommodated according to connection attempt network information indicating a network to attempt a call connection, when a failure of the subscriber server is detected; and
providing to a caller terminal, a guidance indicating that there is a failure being occurred, when a response indicating that no corresponding subscriber is accommodated is returned from another server to which the call connection request is relayed.

6. The relay method according to claim 4, further comprising:
holding in advance the connection attempt network information for each of telephone number bands, and relays the call connection request based on the telephone number band included in the call connection request.

7. The relay method according to claim 4, further comprising:
inquiring to the subscriber server as a destination about subscriber information at a time of the call connection, in a case where number portability is provided in a telephone service.

8. The non-transitory computer readable medium according to claim 5, further comprising:
   holding in advance the connection attempt network information for each of telephone number bands, and relays the call connection request based on the telephone number band included in the call connection request.

9. The non-transitory computer readable medium according to claim 5, further comprising:
   inquiring to the subscriber server as a destination about subscriber information at a time of the call connection, in a case where number portability is provided in a telephone service.

\* \* \* \* \*